June 27, 1933.   R. H. McCLINTIC   1,915,434
WORK SPACING AND FABRICATING APPARATUS
Filed May 26, 1928   5 Sheets-Sheet 1
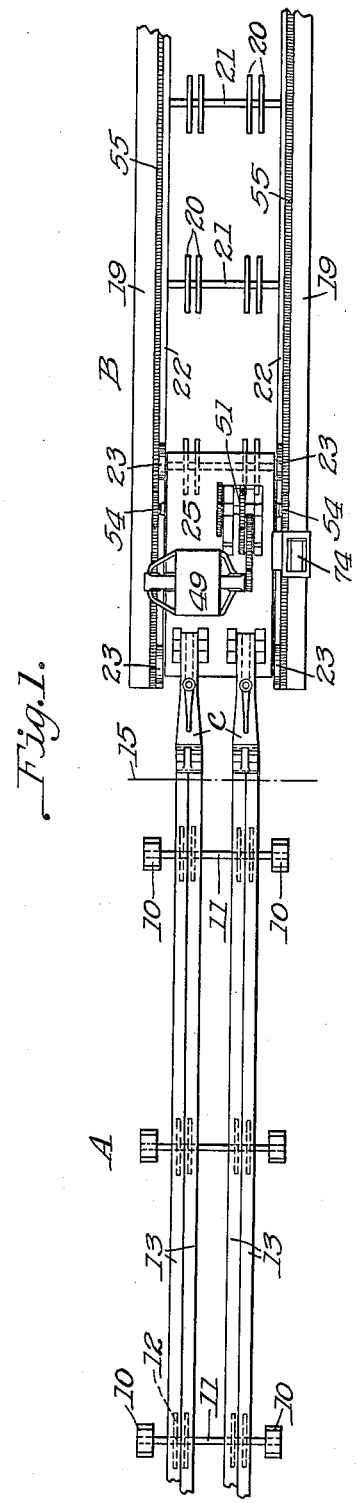
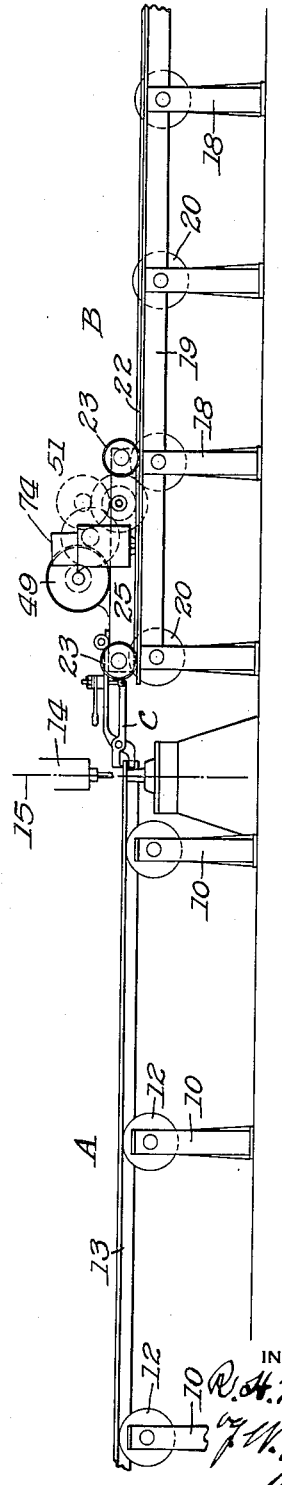

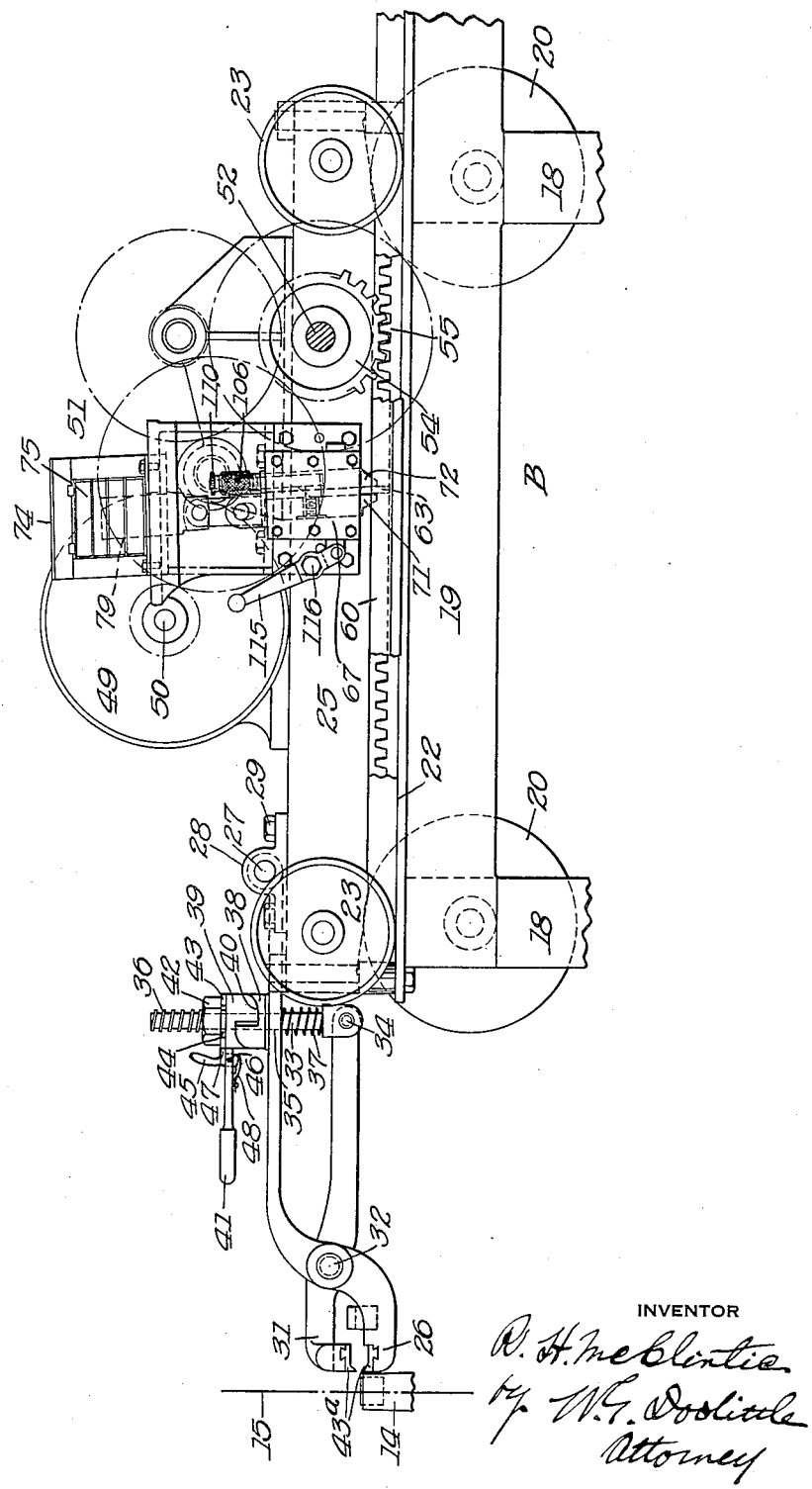

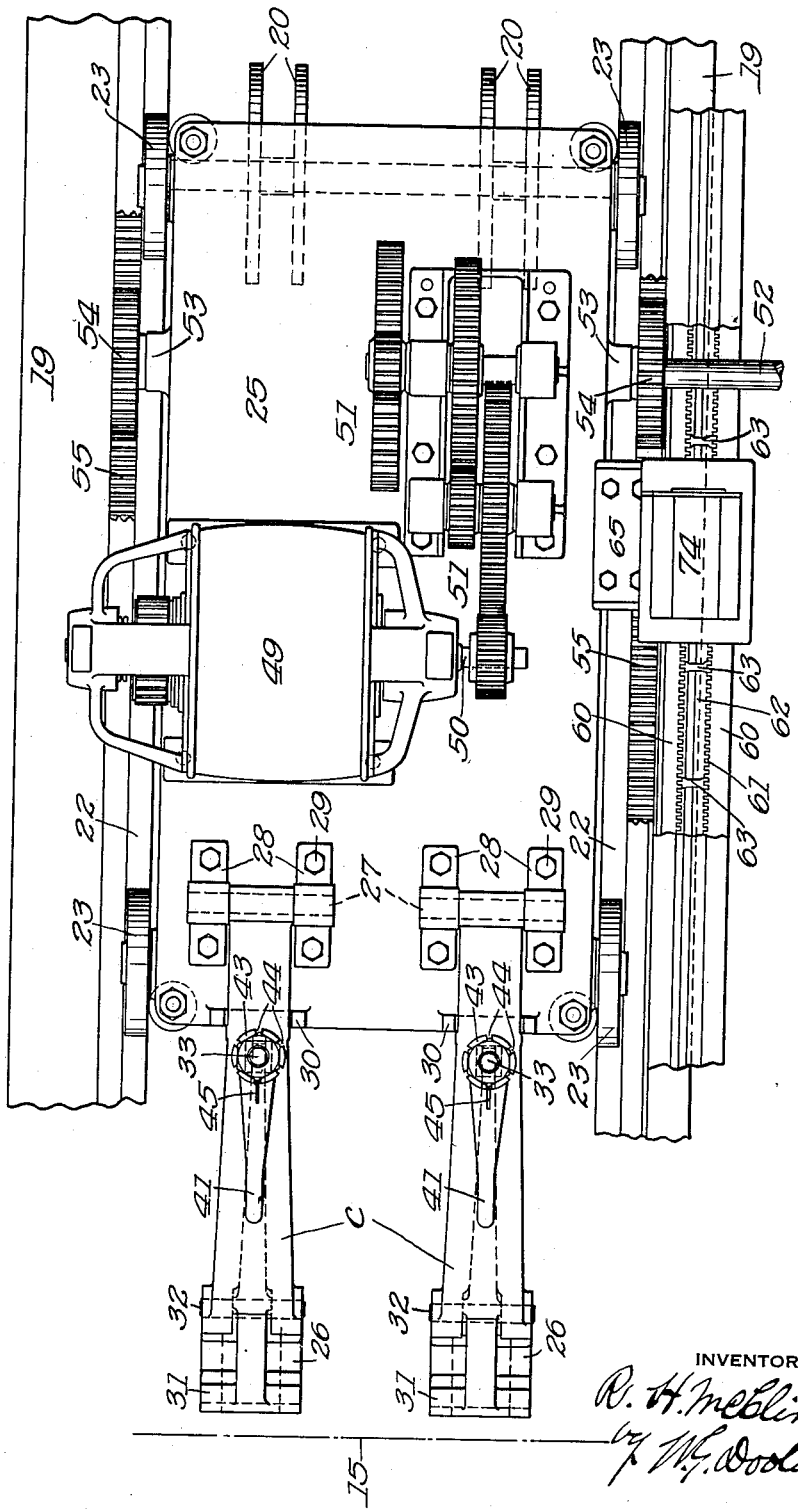

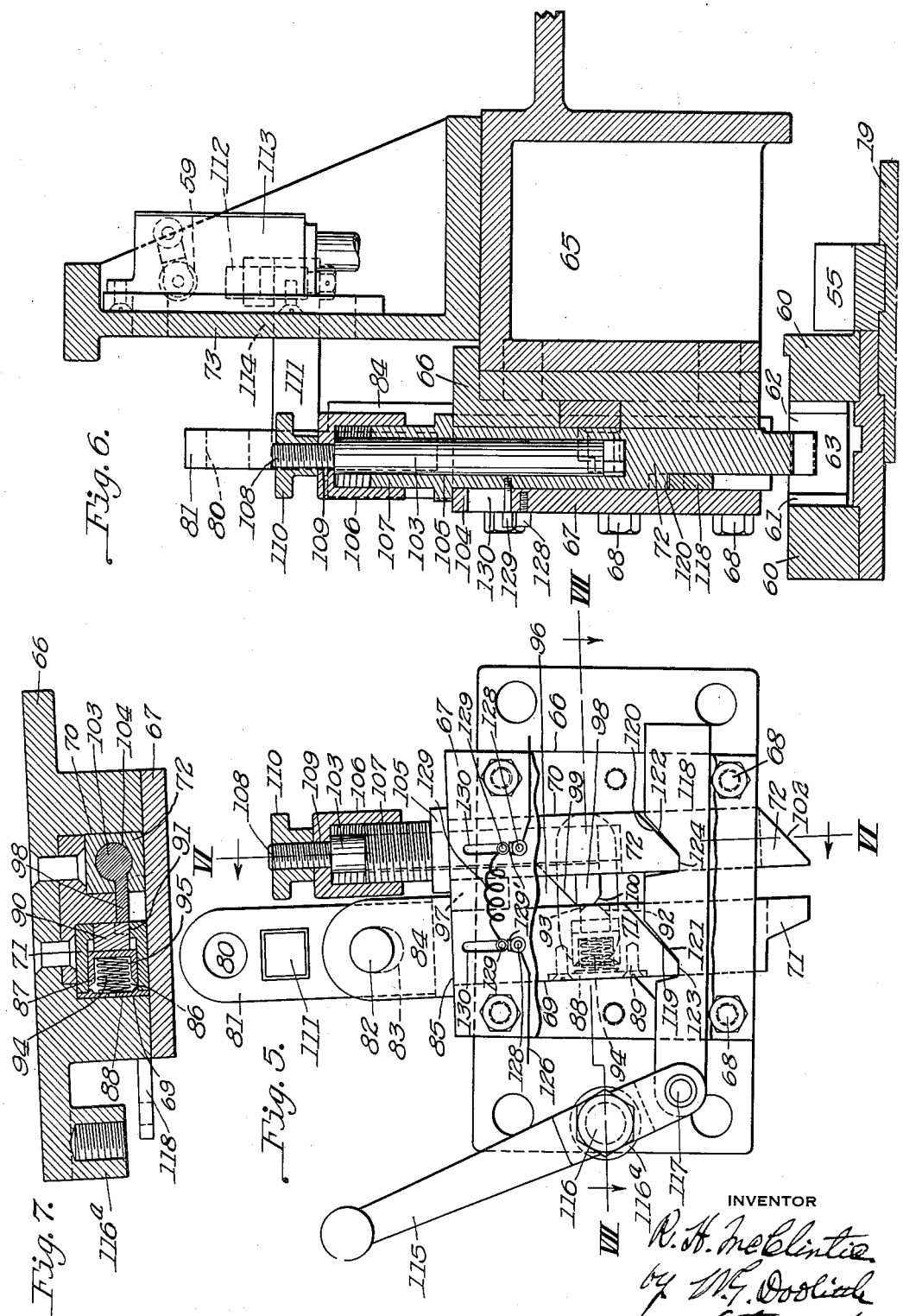

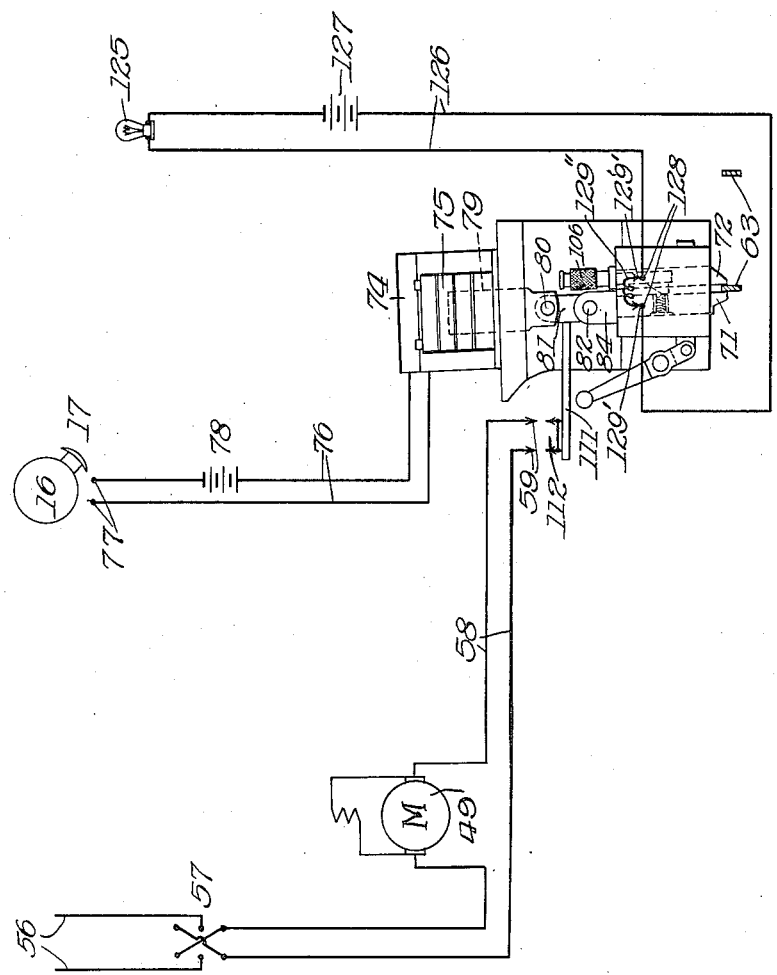

Patented June 27, 1933

1,915,434

UNITED STATES PATENT OFFICE

ROBERT H. McCLINTIC, OF PITTSBURGH, PENNSYLVANIA, ASSIGNOR TO McCLINTIC-MARSHALL COMPANY, OF PITTSBURGH, PENNSYLVANIA, A CORPORATION OF PENNSYLVANIA

WORK SPACING AND FABRICATING APPARATUS

Application filed May 26, 1928. Serial No. 280,736.

This invention relates to improvements in work spacing and fabricating apparatus of the character employed, for example, in punching metallic members, such as plates, bars, angles, and other shapes, and as illustrated the apparatus includes a punch, a spacing table, and co-acting means associated therewith.

While I have shown in the present embodiment, and will particularly describe, apparatus including a punch for operating on the work, my invention is not to be limited to the employment of a punch in connection with the spacing mechanism, for it will be evident that it may be utilized for advancing and positioning metallic members and the like at a point where said members may be operated on otherwise than by punching holes in the members; for example, it may be employed in connection with electric welding apparatus.

The prime object of the present invention is to provide an apparatus or machine of the type stated, by which the work is manipulated and punched by automatically operable means acting in such a manner as to greatly increase the speed of operation over existing machines, and at the same time insuring accuracy of operation.

My invention contemplates the employment of a novel spacing means by which the work is automatically advanced by a step-by-step movement to a punch press or other tool designed to operate on the work through the medium of a carriage, a stop mechanism, and means to control the actuation of the stop mechanism and the movement of the carriage by the operation of the punch or other tool.

My invention also contemplates the inclusion of, and is aimed to provide, an automatically operable trigger mechanism to control the stoppage and escapement of the carriage and to govern the operation of the carriage-propelling motor, preferably mounted on the carriage, and of the dynamic braking type, whereby the advance of the carriage and the work may be stopped and the motor braked without shock, as an incident to opening the circuit of the motor.

A further object is to provide a novel construction having relatively movable triggers to co-act with stop members, one of which triggers is adapted to be temporarily latched to the other trigger, and in its latched position close a switch to the carriage-propelling and work-advancing motor, the other trigger being operable at the proper stage to release the first trigger so that it may move to open said switch and abut the succeeding stop member.

Still another object is to provide a construction wherein the carriage-propelling and work-advancing motor is of the reversible type, in combination with means whereby the triggers may be moved to a position clear of the stop means to permit return of the carriage to initial or starting position.

Various additional objects and advantages will become apparent from a consideration of the description following, taken in connection with the accompanying drawings, illustrating an operative embodiment of my invention.

In said drawings:

Fig. 1 is a plan view of apparatus embodying my invention, showing the parts in initial position and in engagement with work to be advanced;

Fig. 2 is a side elevation of the parts of Fig. 1;

Fig. 3 is an enlarged side elevation, partly broken away to disclose details, particularly showing the carriage of my apparatus;

Fig. 4 is a plan view of the parts shown by Fig. 3;

Fig. 5 is an elevation, showing the triggers and mounting means employed therefor, one of the plates of the latter being broken away to disclose details;

Fig. 6 is a vertical sectional view taken on line VI—VI of Fig. 5;

Fig. 7 is a transverse sectional view taken on line VII—VII of Fig. 5; and

Fig. 8 is a diagrammatic view, showing the wiring employed and the location of some of the operative parts.

Referring specifically to the drawings, wherein like reference characters designate like or similar parts, the work, such as plates, angles, shapes and bars, are adapted to be supported on a rear table, generally designated A. This table comprises a series of longitudinally spaced supports or bearings 10 arranged in transverse pairs and adapted to journal shafts 11, the latter having work-supporting rollers 12. As shown, the rollers are arranged in pairs, with the rollers of each pair slightly spaced apart transversely. As a result, and as shown in the drawings, the rear table is adapted particularly to accommodate four angle bars 13, such angle bars being arranged in pairs, having flanges in contact with and located between the pairs of rollers 12. The rollers 12, by receiving the pairs of flanges between them, as shown, prevent lateral displacement of the work during its travel through the machine.

The work is designed to be advanced relatively to a multiple-drill or punch press 14, so that holes may be punched or drilled through the horizontally arranged flanges of the members 13, the line along which the punches or drills operate being suggested at 15. The punch press includes a rotatable tool-driving shaft 16 (see Fig. 8) which is equipped with a suitably insulated arcuate switch shoe 17 adapted to control the advance of the work in a manner which will later be specifically set forth.

A front or spacing table proper is shown at B and, as illustrated, this table comprises a series of uprights or supports 18 joined at their tops on each side of the table by longitudinally extending horizontally disposed supporting members 19, made up of desired structural shapes. Work-supporting or guide rollers 20, engageable by the work as it advances, and corresponding to those at 12, are carried by transverse shafts 21, having their bearings in the members 19. The members 19 provide a track 22 for the wheels 23 of a longitudinally movable carriage 25. This carriage carries work-gripping means and functions to move the work relatively to the punch press 14, as more fully hereinafter described.

The work gripping means, designated generally by the character C, are mounted at the rear end of the carriage and, as shown, I have provided a pair of said means, each including a jaw 26 carrying a pintle 27 journalled in spaced bearings 28, bolted at 29 to the carriage. Said pintle end of the jaw member is projected for a distance forwardly of the rear end of the carriage and is disposed between guide lugs 30 on the carriage. A companion jaw 31 is pivoted to jaw 26 by a pin 32, and at its inner end is pivotally secured to a vertically extending rod 33 at 34. Rod 33 projects through an opening 35 in the jaw 26 and for a portion of its length it is threaded, as at 36, the remaining portion being unthreaded. If found desirable, an expansive coil spring 37 may be used, this spring being interposed between a shoulder on the rod 33 and the under surface of jaw 26.

Simple and efficient jaw manipulating means are provided, and these means, as shown, include a pair of cooperating plates 38 and 39 having inclined or cam-contacting surfaces 40. Each of these plates is formed with an opening through which the rod 33 is passed, and plate 39 is provided with an operating handle 41. A nut 42 is provided on the threaded portion 36 of the rod 33.

Integral with the nut 42 is a laterally extending flange 43 provided with notches 44. Each handle 41 carries a latch 45 which is pivoted thereto by a horizontal pin 46 and which has a lug 47 adapted to occupy the adjacent notch 44 and be urged to and maintained in that position by means of a leaf spring 48 carried by the arm or handle 41. As a result of this construction, the work may be readily released simply by turning the handles 41 to the extent of ninety degrees, and in so doing, arm 41 is turned in a counter-clockwise direction, unitarily moving plate 39 and nut 42, and the latter, through its screw-threaded engagement with rod 33, serving to slightly lower the latter and accordingly tilt the jaw 31 and separate the portions 43a for release of the work. Reverse movement of the handle 41 to the extent of ninety degrees quickly reversely operates the parts, and particularly the jaw 31, in order to engage succeeding work.

The carriage 25 is designed to be driven by means of an electric motor 49. The drive shaft of said motor, shown at 50, through a set of reduction gears 51, specifically forming no part of my invention, drives a transverse shaft 52 journalled in suitable bearings 53 on the carriage 25. Keyed to shaft 52 are a pair of driving gear wheels 54 which are in mesh with rack bars 55 mounted on the respective supporting members 19 and which extend the full length of the spacing table B.

The motor 49 receives its electric current from any suitable source through feed wires 56 (see Fig. 8) under control of a reversing switch 57, conventionally shown. Said motor 49 is automatically controlled for intermittent operation in a manner later to be set forth, and has its wires 56 extended as at 58 and normally open at contacts 59. Such motor 49 is of the reversible type, so that its main shaft will rotate in either direction, according to the manipulations and positions of switch 57. Also, the motor 49 is of the dynamic braking type. Specifically, it may be of the General Electric type R. F. shunt wound.

Mounted on one side of the front table, on a support 19, are spaced-apart bars 60. These bars 60 have vertical racks or teeth at 61 facing each other and providing a slot 62 in which any suitable number of stop blocks 63 may be transversely arranged at any desired distances apart. Thus, the stopping positions and changing thereof may be set up or varied at will.

Suitably fastened on the carriage 25 is an auxiliary supporting frame or structure 65 having vertical plates 66 and 67 fastened together and against one side thereof, as by means of screws 68. Between said plates, slots or ways 69 and 70 are provided, which respectively accommodate upwardly and downwardly movable trigger members or bars 71 and 72, respectively. As shown in Fig. 3, the lower ends of the triggers are adapted to be positioned on opposite sides of one of the stop blocks 63, at which time holes are punched or drilled in the work 13. These trigger bars 71 and 72 are adapted for upward sliding movement independently of each other so as to disengage one stop block 63 to permit escapement of the carriage, and corresponding spacing of the work 13 relative to the punch press, and then re-engage the succeeding or next stop block to position and hold the carriage and work for the succeeding punching operation, and so on, successively relative to the number of stop blocks used.

Surmounted on the frame 65 is a supporting bracket or the like 73, which has a solenoid 74 attached thereto and insulated therefrom. The winding of said solenoid is designated 75, and has current feed wires 76 leading thereto and from normally spaced contacts 77. One of the wires 76 has an electric battery 78 therein, or is arranged to receive its current from any other desired source. The previously mentioned contact shoe 17 is adapted at times to bridge the contacts 77 and thereby energize the electro-magnet 74, causing its winding 75 to attract or elevate its core, which is designated 79. Said core 79 is transversely pivoted at 80 to a depending link 81, which in turn, by means of a transverse pin 82, is pivotally connected to the trigger 71.

The slot or hole in link 81 through which the pin 82 passes is enlarged as at 83. Trigger 71 has an enlarged head 84, through which the pivot 82 passes and which provides a shoulder 85 engageable with the tops of the plates 66 and 67 to limit downward movement of such trigger 71.

Slidable transversely in a recess 86 of the trigger 71 is a latch member 87 retained therein by means of a plate 88 screwed at 89 to the trigger 71. Said latch 87 has a reduced portion 90 constituting the latch proper, which slidably passes through an opening 91 in the side of trigger 71 opposite to plate 88, the lower corner of such extension 90 being beveled, as shown at 92, and its upper corner being slightly beveled as at 93. Projection of the latch to the maximum extent relative to the trigger 71 is urged by an expansive coil spring 94 engaging the plate 88 and the latch 87, and mainly accommodated in a hollow 95 of such latch. When the latch portion 90 is projected, it is received within a vertical space 96 between the plates 66 and 67 which is adjacent a block or member 97, which aids in maintaining the triggers 71 and 72 in spaced relation.

Trigger 72 has a projection 98 rigid therewith and disposed in the space 96, the upper surface of which is beveled or inclined, as at 99, and the lower corner of which is preferably cut away or beveled, as at 100. It is to be noted that when the triggers 71 and 72 are in engagement with a stop block 63, the latch portion 90 is in end engagement or abutment with the projection 98, so that the trigger 71 is free to be elevated independently of the trigger 72.

The trigger 72 at its lower end is cut away or beveled at 102 to provide a surface adapted to engage the blocks 63 and, due to the inclination, be automatically elevated through such engagement.

The projection 98 is capable of adjustment vertically relative to the trigger 72, to which end it is carried by a vertically slidable rod 103 located in a recess 104 provided longitudinally in the upper portion of trigger 72. Trigger 72 has a laterally extending flange 105 which is adapted to rest on the tops of plates 66 and 67 and thereby limit the downward movement of the trigger 72. A cap nut 106 is screw-threaded on the upper extremity or screw-threaded portion 107 of the trigger 72, and a reduced shank 108 extends loosely through a central opening 109 in the cap nut, and above the same is engaged by a nut 110, the nut 110 and portion 108 having co-acting screw threads, as shown. Through manipulation of the nuts 106 and 110, the elevation of the projection 98 may be slightly varied, when desired, in order to time the dynamic braking action of the motor.

When the solenoid 74 is energized and the trigger 71 accordingly elevated, the surface 92 of latch portion 90 is elevated relatively to trigger 72 so that the spring 94 projects the latch 87 and it overlaps the projection 98, the surface 92 of the former engaging the surface 99 of the latter, the trigger 71 thus being raised above or clear of the adjacent stop block 63 and held in that position.

Extending laterally from the link 81 is an arm 111, which carries electrically connected spaced contacts 112 adapted to engage the contacts at 59. Thus, in the said raised and latched position of trigger 71, due to the engagement of contacts 112 and 59, the circuit through the motor 49 is completed so that the carriage is automatically operated or advanced to the right to the extent permitted by the position of the next or succeeding spacing block 63. The switch affording the contacts 112 and 59 is diagrammatically shown at 113, being supported, for instance, at the rear of the bracket 73 and the arm 111 extending through an enlarged slot 114 in said bracket. The switch 113 specifically forms no part of the invention.

The escapement of the carriage 25 through the energization of the motor 49, as just described, causes the inclined or cam surface 102 of trigger 72 to engage the upper end of the next stop block 63, the inclination causing the trigger 72 to elevate so that its lower end is above such stop block and may move beyond the same. Such upward movement of the trigger 72, due to the inclination of surfaces 92 and 99, moves the latter out of engagement with the former, whereby the trigger 71 immediately falls in front of the said "next" stop block, breaking the circuit through the motor 49 by lowering the arm 111 and contacts 112. The carriage continues to move or drift until the trigger 72 traverses the top of said stop block, at which time the lowered trigger 71 engages the front face of said block, and the trigger 72 falls behind said block, there being a slight amount of clearance provided to facilitate the engagement of the trigger 72 behind said block. Since the motor 49, as aforesaid, employs the dynamic braking principle, operation of the motor and of the carriage will come to rest without shock or jar, and thus without the employment of any extraneous means, such as braking mechanism. Thereafter, the punch press 14 is set in motion for one cycle only by the operator at a time when the carriage is stationary against the stops, the operation being so timed that after punching of the desired line of holes, shoe 17, operated by the press 14 bridges the contacts 77 and thus starts another escapement operation of the carriage and associated parts in the manner just traced, until the next stop block 63 is reached.

After all of the holes have been punched in the work 13, the carriage is returned to the left to starting position, and this end is accomplished under the action of the motor 49. To permit such return of the carriage, both the triggers 71 and 72 have to be elevated to and maintained in a position above the stop blocks 63. To this end, suitable clearance is provided between the plates 66 and 67 for operation of a hand lever 115, such lever being pivoted by a transverse bolt 116 engaging the boss 116a of plate 66. At the lower end, lever 115 is pivoted at 117 to a trigger-elevating or displacing bar 118.

Said bar 118 is disposed under parallel inclined shoulders 119 and 120 provided on the triggers 71 and 72 above their lower ends and which are adapted to be engaged by correspondingly inclined or cam surfaces 121 and 122, provided in notches in the upper edge of bar 118. It will be noted, therefore, that with the surfaces 119 and 120 in engagement with those at 121 and 122 respectively, operation of the upper end of lever 115 to the right moves the bar 118 to the left, causing its surfaces 121 and 122 to exert cam action on the surfaces 119 and 120, thereby elevating triggers 71 and 72, and moving portions of the upper edge of bar 118 under straight shoulders 123 and 124 on said triggers, thus maintaining the triggers elevated above the stop blocks 63 until the upper end of lever 115 is moved sufficiently to the left to permit the triggers 71 and 72 to drop to lowermost position.

The movement of lever 115 is such that in the elevated position of the triggers 71 and 72, such lever 115 is past the vertical passing through the axis of pin 116. It is to be noted that the longitudinal axes of the triggers 71 and 72 are slightly inclined, so as to facilitate elevation of such triggers through co-action of the various cam surfaces or means causing elevation or displacement thereof.

A suitable lamp or signal 125 is adapted to be arranged for observation by the operator of the punch press 14, so as to show when the triggers 71 and 72 are in lowermost position and on opposite sides of a stop block 63 and the work properly arranged for punching. Said lamp 125 is arranged in a circuit involving wires 126 receiving electric energy from a battery 127. Said wires 126 lead to spaced contacts 128 insulated from and mounted, for instance, on the outside of the plate 67. A pin 129 is carried by each trigger 71 and 72 and arranged for movement in vertical slots 130 provided in the plate 67. Carried by the outer ends of pins 129 are contacts 129', which are insulated from such pins and which are electrically connected by a slack conductor 129''. Thus, it will be seen that when the triggers 71 and 72 are lowered, the contacts 128 and 129' close a circuit through the lamp 125, but that, when either or both of said triggers 71 and 72 is elevated, the electric circuit through said lamp 125 is broken.

Presuming operation of the machine, with the work 13 positioned as shown and engaged by the grippers, as at C, switch 57 is thrown to closed position for normal operation of motor 49 to move carriage 25 to the right, when the circuit through said motor 49 is closed. The operator at the punch press operates the latter to provide the first transverse series of holes through the horizontal flanges of the work or angle bars 13. After the punching of said series of holes and through the continued operation of the punch press for the current cycle, shoe 17 engages contacts 77, thus closing an electric circuit through the winding 75 of electro-magnet 74 from the source of energy 78 through wires 76.

The energization of magnet 74 elevates the trigger 71 to a position where latch member 90 disengages the flat end of projection 98 and spring 94 projects the latch to a position where surface 92 engages surface 99, and the latch portion 90 accordingly overlaps the projection 98 and is temporarily latched in elevated position, where its lower end is above the stop blocks 63. Said elevation of trigger 71 by elevating arm 111 closes an electric circuit through the motor 49 by engagement of contacts 59 and 112, the current to the motor 49 flowing from the source through switch 57 and feed wires 56 and 58.

The energized motor 49 thereupon moves the carriage 25 to the right and accordingly moving the work 13 therewith. Previously, the stop blocks 63 are arranged according to the distances apart or spacing desired for the holes to be punched through the angle bars 13. The automatic advance of the carriage 25 through the action of the motor 49 brings inclined surface 102 of trigger 72 into engagement with the adjacent upper edge of the next or succeeding stop block 63, resulting in the trigger 72 being automatically raised so that its lower end is above said succeeding stop block and is moved across the same.

The elevation of trigger 72 through the said cam action between stop blocks 63 and surface 102 causes the projection 98 to be raised above the surface 92 and thus to release the latch portion 90. Thus, when the trigger 72 is beyond the said succeeding stop block 63, trigger 72 and the trigger 71 will immediately and automatically fall by gravity to position on opposite sides of said succeeding stop block, since, in the meantime, the operation of the punch press will have moved the contact 17 out of bridging relation with those at 77, and thus broken the electric circuit through the solenoid 74. The lowering of trigger 71 breaks the circuit through the electric motor 49, since contacts 112 are lowered with respect to contacts 59.

Attention is particularly called to the fact that at the instant contacts 112 disengage contacts at 59 and accordingly break the circuit through motor 49, movement of the carriage is at once braked without jar or shock to the apparatus since, as previously mentioned, the motor 49 has dynamic braking action. The punch press 14, continuing to operate, causes the succeeding transverse series of holes to be punched, the spacing being determined, of course, by the distance between adjacent stop blocks 63, after which the punch press automatically causes shoe 17 to re-engage contacts 17 and thus initiate another escapement or advancing movement of the carriage according to the arrangement or position of the stop blocks 63. In this manner, the punching of the angles, plates or other work and its advance and escapement is automatic throughout the entire operation or length of the work 13.

After the work has all of the desired holes punched therein or has moved to its limit to the right, the operator first reverses the position of switch 57, so that the current will flow through the motor 49 in a reverse direction to that which operates the same to advance the work. At this stage, the work may be removed from the grippers. Thereupon, the operator manually engages lever 115 at its upper end, throwing it to the right, and causing bar 118 to move to the left, whereby the co-action of cam surfaces 119 and 120 with those at 121 and 122 respectively, elevates both triggers 71 and 72 simultaneously, or as a unit, to positions above the stop blocks 63 and with straight upper edge portions of the bar 118 engaging under the straight shoulders 123 and 124, the longitudinal axis of the lever 115 in the latter position being slightly past the vertical passing through the axis of pin 116.

Since operation of the motor 49 may be dynamically braked instantly, operation of the carriage is readily controlled by the operator through the throwing of switch 57. This is advisable in stopping the advance of work and carriage, and also in stopping the return movement of the carriage to its initial or starting position. At the same time, it is to be understood that I may employ automatic electrically operable or other means in association with the motor 49 and the said switch 57, or otherwise, (not shown because forming no part of the present invention) to automatically stop the advance movement of the carriage and work and the return movement of the carriage to initial or starting position.

Various changes may be resorted to provided they fall within the spirit and scope of the invention.

I claim:

1. In apparatus of the character described, spacing mechanism including a stop means, rear and forward triggers between which the said means is adapted to be engaged, means mounting the rear trigger for movement to a position clear of such stop means, means for latching the rear trigger in the latter position to the forward trigger, said forward trigger being movable relatively to the rear trigger to release said rear trigger for movement to position for engagement with said stop means.

2. In a spacing mechanism, a stop means, rear and forward triggers between which the stop means is adapted to be engaged, means mounting the rear trigger for movement to a position clear of such stop means, means for latching the rear trigger in the latter position to the forward trigger, said forward trigger being movable relatively to the rear trigger to release said rear trigger for movement to normal position, means to advance work including a propelling motor, said motor having an electric switch and the rear mentioned trigger including a part of said switch and adapted to close the same in its clear position.

3. In a spacing mechanism, a first stop means, a second stop means, forward and rear triggers between which the first stop means is adapted to be engaged, means operable to move the rear trigger clear of the first stop means so that it may be moved to a position between the first and second stop means, co-acting means on the triggers to retain the rear trigger in said clear position, work advancing mechanism controlled by the rear trigger for escapement when the latter trigger is in said clear position, the forward trigger being engageable with the second stop for automatic displacement thereby to release the said co-acting means so that the rear trigger may release control of the work-advancing mechanism and abut the second stop means.

4. In a spacing mechanism, stop means, trigger means to coact with the stop means, a solenoid arranged to actuate said trigger means, in combination with a movable switch to periodically close the circuit through said solenoid, a work advancing carriage, a propelling motor for said carriage, and means operable by the trigger means to control operation of said propelling motor.

5. In a spacing mechanism, a plurality of stop means, rear and forward triggers, a solenoid for periodically moving the rear trigger clear of the first stop means, co-acting means between the triggers to latch the rear trigger in the said clear position, said triggers with the rear trigger in the clear position being movable toward the second stop means, said second stop means serving to move the forward trigger relatively to the rear trigger to release the latter so that it may have stop engagement with the second stop means.

6. In a spacing mechanism, first and second stop means, a rear trigger and a forward trigger adapted to receive the first stop means between them, means mounting the rear trigger for movement to a position clear of the first stop means, co-acting means on the triggers to secure the latter trigger in said clear position to enable both triggers to be moved toward the second stop means, said second stop means having a surface engageable by the forward trigger to move the latter relatively to the rear trigger to release the co-acting means so that the rear trigger may move to original position for stop engagement with the second stop means.

7. In an apparatus of the class described, a work advancing carriage having a propelling motor thereon, a spacing mechanism including rear and forward triggers on said carriage, in combination with first and second stop means relatively to which the carriage moves, a solenoid to move the rear trigger to a position clear of the first stop means, in combination with a rotatable switch member to periodically close the circuit through said solenoid, means to set said motor in operation while the rear trigger is in the clear position, co-acting means between the triggers to maintain the rear trigger in said clear position for movement thereof past the first stop means incident to advance of the carriage, the forward trigger having a portion engageable with the second stop means to displace the forward trigger and thereby release said co-acting means to enable the rear trigger to return to normal position to cease operation of the motor and for stop engagement with the second mentioned stop means.

8. In an apparatus of the class described, a work advancing carriage having a propelling motor therefor, a plurality of stop means relatively to which the carriage moves, a supporting structure on the carriage, rear and forward triggers carried by said structure and adapted to engage opposite sides of the first mentioned stop means, means operable periodically to raise the rear trigger to a position clear of the first mentioned stop means, co-acting means between the triggers to latch the rear trigger in said clear position, means carried by the rear trigger to close the circuit through said motor in the clear position of such trigger, said forward trigger being engageable with a second mentioned stop means as the carriage advances to vertically slide and displace the forward trigger, whereby the rear trigger is released so that it may open the circuit to said motor and for stop engagement with the second mentioned stop means.

9. A trigger mechanism of the class described having a supporting structure, rear and forward triggers mounted thereby, first and second stop means, said rear trigger being movable to a position clear of the first stop means, said forward trigger having a projection, means on the rear trigger engaging said projection to latch the rear trigger in its clear position, the forward trigger being engageable with the second stop means to move the projection out of latched engagement with the rear trigger, whereby the rear trigger may return to normal position for engagement with the second stop means.

10. A trigger mechanism of the class described having a supporting structure, rear and forward triggers mounted thereby, first and second stop means, said rear trigger being movable to a position clear of the first stop means, said forward trigger having a projection, means on the rear trigger engaging said projection to latch the rear trigger in its clear position, the forward trigger being engageable with the second stop means to move the projection out of latched engagement with the rear trigger, whereby the rear trigger may return to normal position for engagement with the second stop means, and means mounting said projection for adjusting movement longitudinally of the forward trigger.

11. A trigger mechanism of the class described having a supporting structure, rear and forward triggers slidably mounted in said structure, in combination with first and second stop means, the forward trigger having a cam surface, said forward trigger having a projection provided with an upper inclined surface, the rear trigger having a latch, means urging projection of said latch, the slidable mounting of the rear trigger permitting the same to be raised clear of the first mentioned stop means, and the latch in such position to engage said inclined surface to hold the rear trigger in said clear position, said cam surface of the forward trigger being engageable with the second mentioned stop means to slide the forward trigger to a position where said projection releases said latch so that the rear trigger may be returned to normal position for stop engagement with the second mentioned stop means.

12. A trigger mechanism of the class described having a supporting structure, rear and forward triggers slidably mounted in said structure, in combination with first and second stop means, the forward trigger having a cam surface, said forward trigger having a projection provided with an upper inclined surface, the rear trigger having a latch, means urging projection of said latch, the slidable mounting of the rear trigger permitting the same to be raised clear of the first mentioned stop means, and the latch in such position to engage said inclined surface to hold the rear trigger in said clear position, said cam surface of the forward trigger being engageable with the second mentioned stop means to slide the forward trigger to a position where said projection releases said latch so that the rear trigger may return to normal position for stop engagement with the second mentioned stop, said triggers being cut away to provide cam shoulders, a bar slidably mounted in said structure, means to actuate said bar, and said bar having cam shoulders engageable with the said cam surfaces to simultaneously move the triggers to a position clear of said stop means.

13. A trigger mechanism having a supporting structure, rear and forward triggers slidably mounted thereby in combination with first and second stops, a link pivoted to the rear trigger, means connected to the link adapted to operate the same to move the rear trigger clear of the first stop means, means on the rear trigger for latch engagement with the forward trigger in the clear position of the former, a carriage on which said supporting structure is mounted, a propelling motor for said carriage, an arm extending from said link having switch means thereon to close the circuit through said motor in the said clear position of the rear trigger, said forward trigger being engageable with the second stop means for upward displacing movement to release the rear trigger so that the latter may fall to break the circuit through said motor and for stop engagement with the second mentioned stop means.

14. A trigger mechanism comprising a mounting structure, rear and forward triggers slidably mounted by said structure, in combination with stop means to co-act with said triggers, a projection on the forward trigger, a rod carrying said projection, means to slide said rod longitudinally of the forward trigger to adjust the position of said projection, the rear trigger having a recess, a latch member disposed therein, a spring urging projection of said latch member, said latch member normally abutting said projection, the rear trigger being adapted for upward movement to overlap said projection to secure the rear trigger in a position clear of the first mentioned stop, and the forward trigger being engageable with another stop to upwardly displace the forward trigger and thereby release the rear trigger so that it may move into stop relation with the latter stop.

15. In apparatus of the character described, spacing mechanism including a stop means, forward and rear triggers between which the stop means is adapted to be engaged, means operable to move the rear trigger clear of said stop means and to close a propelling motor circuit, and work advancing mechanism driven by said motor cooperating with the spacing mechanism having its forward movement controlled by said triggers when the rear trigger is clear of the stop means, thereby closing said circuit to start the motor.

16. In a spacing machine, a supporting framework, a template bar thereon having stop elements, a carriage movable on the framework, a motor causing movement of the carriage, a pawl carried by the carriage and cooperating with the stop elements on the bar, circuits controlling the motor, a switch controlling one of said circuits, and connections between the pawl and switch whereby operation of the pawl by the stop elements will cause opening of the switch.

17. In a spacing machine, a supporting framework, a carriage adapted to reciprocate along said framework, means to move the carriage, means to control the functioning of said means whereby it may be caused to move either forwardly or backwardly in accordance with the positions of certain controlling elements, controlling elements associated with the framework, other controlling elements associated with the carriage and cooperating with the first named controlling elements to predetermine the functioning of the first named means, including switch operating elements which actuate certain of the control means for the controlling of the first named means.

18. In a spacing machine, a supporting framework, a template bar associated therewith having stop elements thereon, a carriage movable with relation to the framework, a motor causing movement of the carriage, a pawl carried adjacent the template bar and cooperating with the stop elements thereof, circuits controlling the functioning of the motor, a switch controlling one of said circuits, and connections between the pawl and switch whereby operation of the pawl by the stop elements will cause opening of the switch.

19. In a machine of the character described, a movable work carrier, motive means for moving the work carrier, mechanism connecting the motive means and work carrier, stop means for definitely positioning the work carrier when it is stopped for operations upon the work, said mechanism holding the work carrier in definite positions relative to the stop means during the work operations.

In testimony whereof I affix my signature.

ROBERT H. McCLINTIC.

CERTIFICATE OF CORRECTION.

Patent No. 1,915,434. June 27, 1933.

ROBERT H. McCLINTIC.

It is hereby certified that error appears in the printed specification of the above numbered patent requiring correction as follows: Page 7, lines 53 and 54, claim 12, for "surfaces" read "shoulders"; and that the said Letters Patent should be read with this correction therein that the same may conform to the record of the case in the Patent Office.

Signed and sealed this 22nd day of August, A. D. 1933.

M. J. Moore.

(Seal) Acting Commissioner of Patents.